United States Patent [19]
Germunson et al.

[11] Patent Number: 6,125,615
[45] Date of Patent: Oct. 3, 2000

[54] BAGGING APPARATUS

[75] Inventors: Gary G. Germunson, Yakima; Miles Taggart Hanon, Des Moines, both of Wash.

[73] Assignee: Yakima Wire Works, Yakima, Wash.

[21] Appl. No.: 09/461,669

[22] Filed: Dec. 14, 1999

Related U.S. Application Data

[62] Division of application No. 08/953,162, Oct. 17, 1997, Pat. No. 6,000,200.

[51] Int. Cl.$^7$ ..................................................... B65B 01/32
[52] U.S. Cl. ................................. 53/469; 53/443; 53/502
[58] Field of Search ............................ 53/154, 168, 237, 53/502, 570, 469, 284.7, 443

[56] References Cited

U.S. PATENT DOCUMENTS

| | | |
|---|---|---|
| 3,822,527 | 7/1974 | Germunson et al. . |
| 4,018,029 | 4/1977 | Safranski et al. . |
| 4,177,621 | 12/1979 | Powell, Jr. . |
| 4,253,292 | 3/1981 | Lipes . |
| 4,382,527 | 5/1983 | Lerner . |
| 4,428,179 | 1/1984 | Jordan et al. . |
| 4,607,478 | 8/1986 | Maglecic . |
| 4,720,961 | 1/1988 | Jordan . |
| 4,813,205 | 3/1989 | Mikata et al. . |
| 5,001,889 | 3/1991 | Mueller . |
| 5,024,047 | 6/1991 | Leverett . |
| 5,050,370 | 9/1991 | Stederoth . |
| 5,174,094 | 12/1992 | Powell, Jr. . |
| 5,191,947 | 3/1993 | Petersen . |
| 5,331,792 | 7/1994 | Kitchen . |
| 5,339,607 | 8/1994 | Rieger . |
| 5,340,269 | 8/1994 | Caridis et al. . |
| 5,345,748 | 9/1994 | Powell, Jr. . |
| 5,737,904 | 4/1998 | Simionato . |
| 5,813,195 | 9/1998 | Nielsen et al. . |

*Primary Examiner*—Daniel B. Moon
*Attorney, Agent, or Firm*—Michael J. Donohue; Seed IP Law Group PLLC

[57] ABSTRACT

An apparatus and method for accumulating specified weights of objects, such as apples, and delivering them to a plurality of off-load conveyors, the off-load conveyors delivering the apples to chutes which can then guide the apples into a single bagging apparatus. The flow of the apples on the chutes is controlled by a gate overlying all the chutes and a speed control brush that rotates at a desired speed to control the flow rate of the apples down the chute into the bagger. The apparatus and method are controlled by the interaction of a computer and a programmable logic controller.

11 Claims, 5 Drawing Sheets

BAGGING APPARATUS

CROSS-REFERENCE TO RELATED APPLICATION

This application is a divisional of allowed U.S. patent application Ser. No. 08/953,162, filed Oct. 17, 1997 now U.S. Pat. No. 6,000,200

TECHNICAL FIELD

This invention relates to economically filling bags to a specified weight with objects, such as apples.

BACKGROUND OF THE INVENTION

This invention relates to a device which can take objects, such as apples, from a sorting conveyor in which the apples are individually weighed in pockets in the conveyor and then bagging those apples into a conventional bagger. Apples are off-loaded from the sorter conveyor into a plurality of chutes that feed each bagger.

Heretofore objects, such as apples, that are collected or bagged from sorting conveyors of the type which weigh each apple and accumulate the weight of those apples to a specified bag weight fill each bag from a single off-load conveyor. This requires an expensive bagging apparatus for each off-load conveyor, increasing the cost of the overall system and slowing the sorting and bagging of the apples unless multiple bagging apparatuses are supplied.

SUMMARY OF THE INVENTION

It is an object of this invention to increase the speed of bagging objects from a sorting conveyor by providing multiple off-loading conveyors and directing the objects that are placed on the off-load conveyors from the sorting conveyor onto guide means which deliver those objects at the specified weight to a single bagger. For example, three off-load conveyors can be directed to one bagging apparatus, thus providing a rapid flow of objects to the bagging apparatus.

DETAILED DESCRIPTION OF AN EXEMPLARY EMBODIMENT

Figure 3:
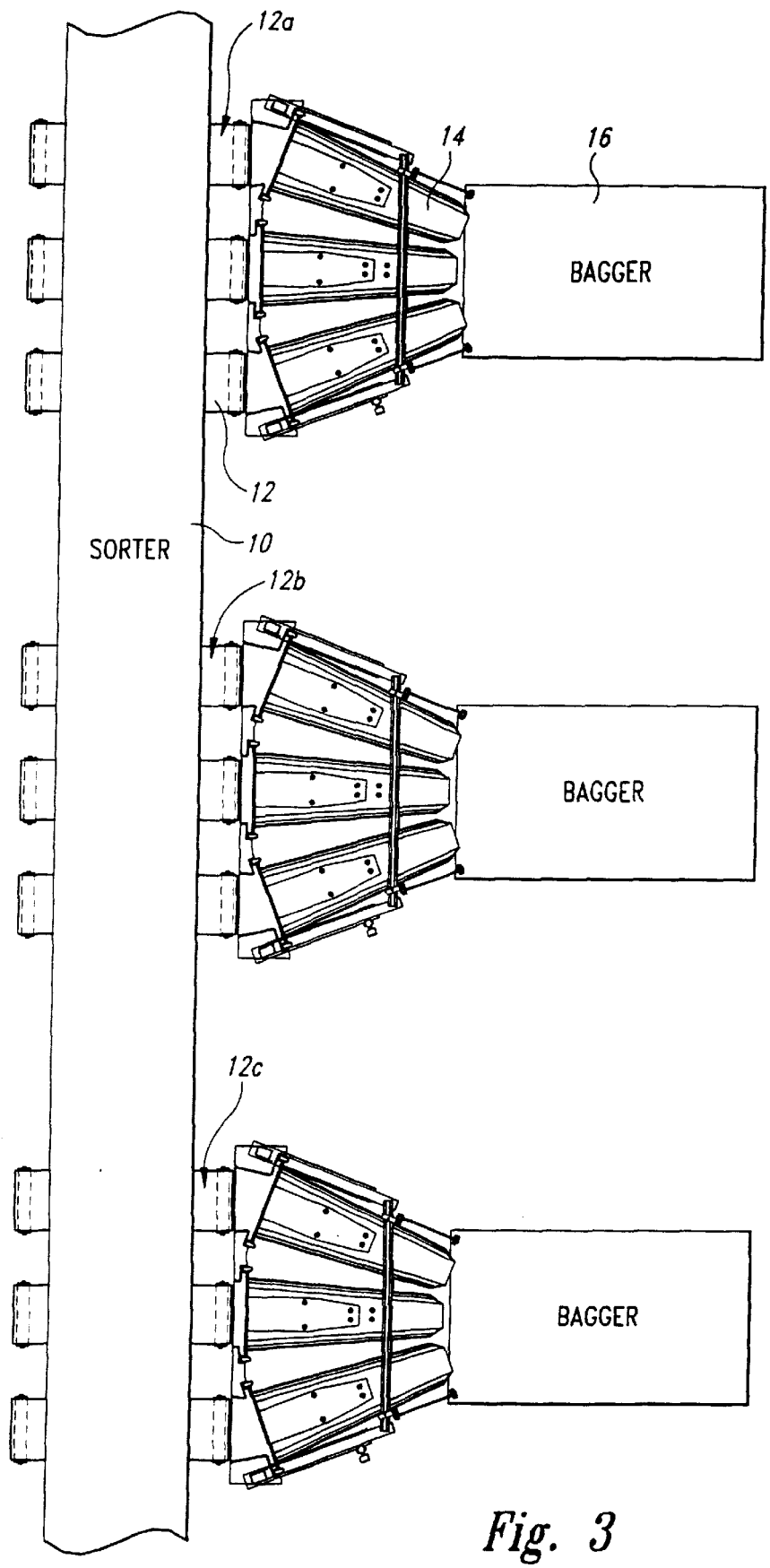
FIG. 3 is a schematic plan view showing a plurality of baggers off-loading from a single sorting conveyor.

As best shown in FIG. 3, a sorter 10 of the type suitable for sorting, weighing and accumulating the individual weights of objects such as apples or other fruit is illustrated delivering those apples to a plurality of sets of off-load conveyors 12A, 12B and 12C. Each of the conveyors in the sets of conveyors is an identical off-load conveyor 12. Each set of off-load conveyors deliver the apples to sets of chutes 14 all of the same construction. The chutes in each set, as best shown in FIG. 3, are angled into a converging pattern so that they all empty to a single bagger 16.

Figure 1:
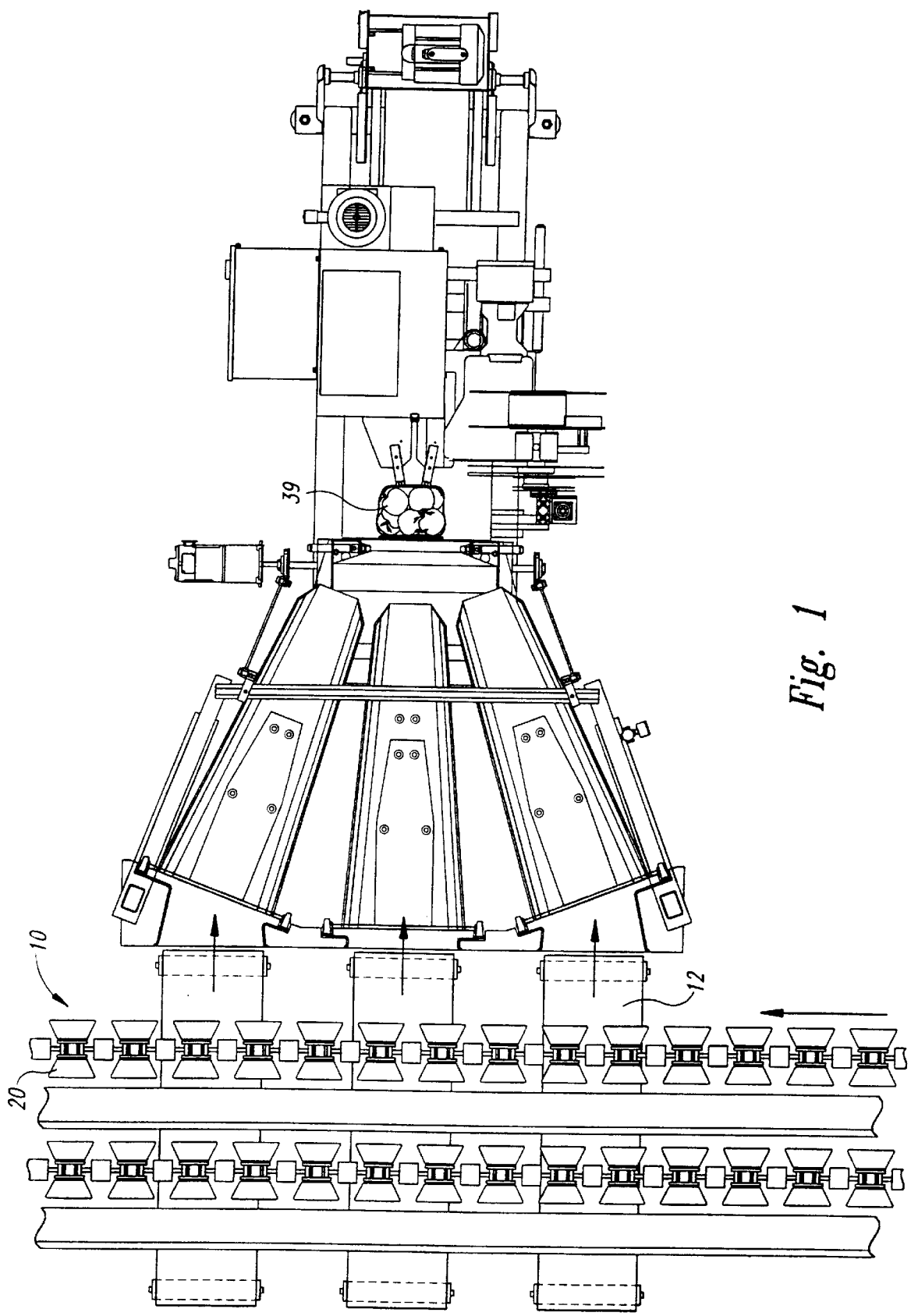
FIG. 1 is a top plan view of a sorter and bagging apparatus employing the principle of the invention.
Figure 2:
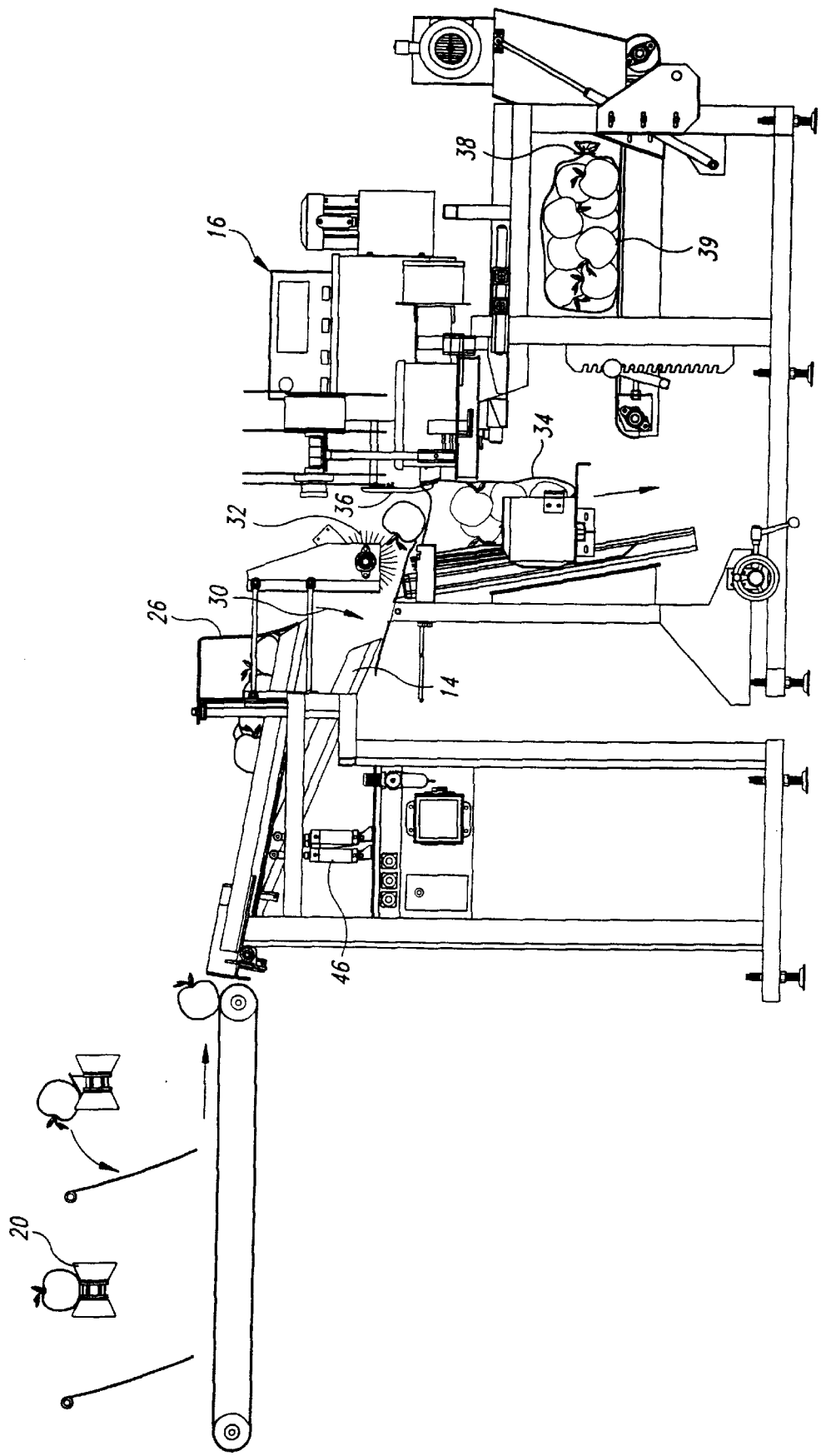
FIG. 2 is a side elevation of the sorting and bagging apparatus.

The sorting conveyor 10 is a well-known sorter manufactured by Autoline Manufacturing Company of Reedley, Calif. In this type of conveyor, a plurality of pockets 20 each hold an individual fruit, such as shown in FIG. 2, and weigh each fruit in each pocket. Using a conventional type of computing device, such as a personal computer (PC) 22, thereafter the weight of fruit off-loaded to each off-load conveyor 12 is accumulated so that the specified weight for a bag of apples is collected at each off-load conveyor. When the fruit then are at the specified weight on a chute, the chute drops to the lowered position shown in FIG. 2 which is indicated by the direction of the arrow 30. The other two chutes still remain in a raised position and the apples accumulated on those chutes are held by a common gate 26. As best shown in FIG. 2, the speed at which the apples roll off the lowered chute 14 is controlled by a rotating brush 32. The brush rotates in a counterclockwise direction as shown in FIG. 2. If the brush is rotated slowly, the fruit, such as apples can be handled more carefully and gently. If the apples are very hardy or are another kind of hardy fruit, the brush can be rotated more rapidly to deliver the apples or fruit to the bagging device or bagger 16 more quickly.

The bagging device 16 is of a conventional construction having a plurality of plastic bags 34 held on wickets. A machine of a type used for that purpose is described in U.S. Pat. No. 3,822,527, the description of which is incorporated herein. The bags are individually opened by a finger 36, allowing the apples to fall into the open bag. The finger 36 is rigidly connected to a pneumatic finger actuator 37 which is operable to move the finger 36 in a cyclic motion to open one of the bags 34. When the bag is full, the filled bag is moved to the right in FIG. 2 through a conventional bag closing device where a closure 38 is attached to the gathered neck of the bag as shown, for example, in the filled bag 39 in FIG. 2.

The brush 32 is driven by a conventional motor 40 which is controlled by a conventional programmable logic controller (PLC) 44. The chutes are individually raised and lowered by hydraulic or pneumatic chute actuators 46 also controlled by the PLC 44.

The sorter 10 is controlled by the PC 22 to provide small objects such as items of fruit, and more particularly apples, to a selected chute 14. The PC 22 is programmed to collect data for each individual fruit transported by the sorter 10. The PC 22 identifies the selected chute 14 and causes the sorter 10 to discharge fruit from the pockets 20 to the selected chute 14 while calculating a total weight of fruit discharged. The calculation of the total weight is based on the weight of each individual fruit discharged into the selected chute 14. The PC 22 is programmed to fill the selected chute 14 with a quantity of fruit to nearly the specified weight for a full bag of fruit and calculate a difference between the total weight and the specified weight. The PC 22 then chooses a fruit having a weight within an acceptable tolerance of the difference and causes the sorter 10 to discharge the chosen fruit into the selected chute 14. The sorter 10 may pass over a number of individual fruits before the chosen fruit is positioned to be discharged into the selected chute 14, and the PC 22 may cause the sorter 10 to discharge fruit other than the chosen fruit to a chute 14 adjacent to the selected chute 14.

Figure 4:
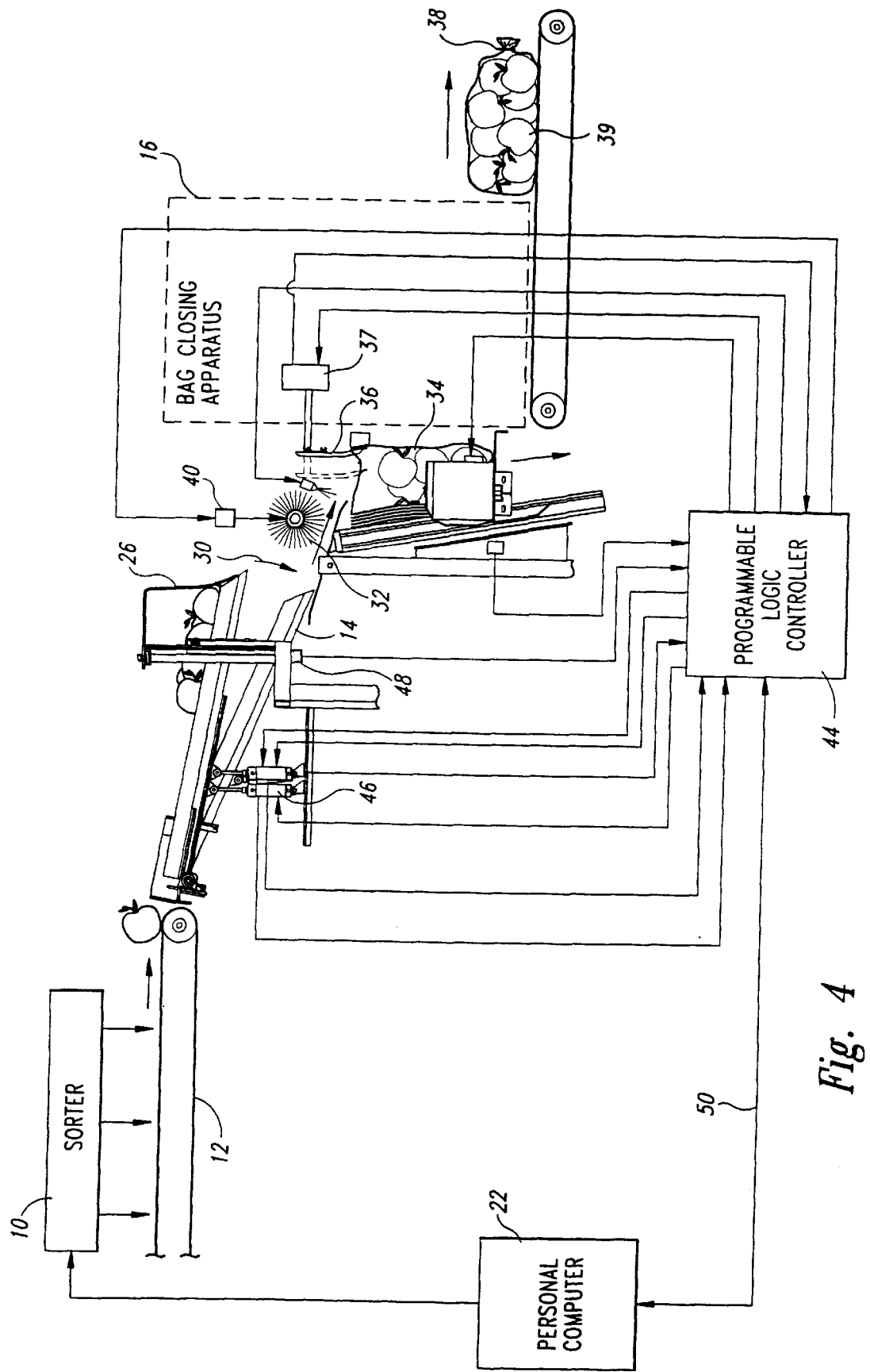
FIG. 4 is a schematic side elevation of the bagging apparatus with the sorter.

As best shown in FIG. 4, the bagger 16 is controlled by the PLC 44. As described above, the PLC 44 controls various devices on the bagger 16 such as the chute actuators 46. The PLC 44 directs one of the chute actuators 46 to lower the selected chute 14 such that the fruit in the selected chute 14 is allowed to fall or roll into an open bag 34. The PLC 44 also receives data from several sources in the bagger 16, including a signal from a magnetic reed switch 48 which is fixed on the bagger 16 below the chutes 14. The signal from the magnetic reed switch 48 indicates when one of the chutes 14 has been lowered to deliver fruit to the bagger 16. In another example, the PLC 44 provides a signal to the finger actuator 37 to cause the finger 36 to be moved to open a bag 34. The PLC 44 then receives a signal from the finger actuator 37 to indicate that a bag 34 has been opened and that the bagger 16 is prepared to receive fruit from one of the chutes 14.

The PLC 44 communicates with the PC 22 through a port 50 to coordinate the delivery of fruit from the sorter 10 to the bags 34. The port 50 may be any conventional port such as an RS 232 port.

As described above, the embodiment of the invention shown in FIGS. 1–4 includes sets of three chutes 14 arranged to deliver fruit to each bagger 16. The arrangement of three chutes 14 per bagger 16 speeds the process of delivering fruit to the bags 34 because a first chute 14 may be receiving fruit from the sorter 10 while a second chute 14 is being lowered to fill a bag 34 and a third chute 14 is receiving fruit that weights too little or too much to top off the first chute 14. The bagger 16 opens and closes the bags 34 rapidly enough to receive loads of fruit of the specified weight from each of the three chutes 14 in a sequence such that none of the chutes 14 holds the specified weight of fruit for an excessive period of time.

Figure 5:
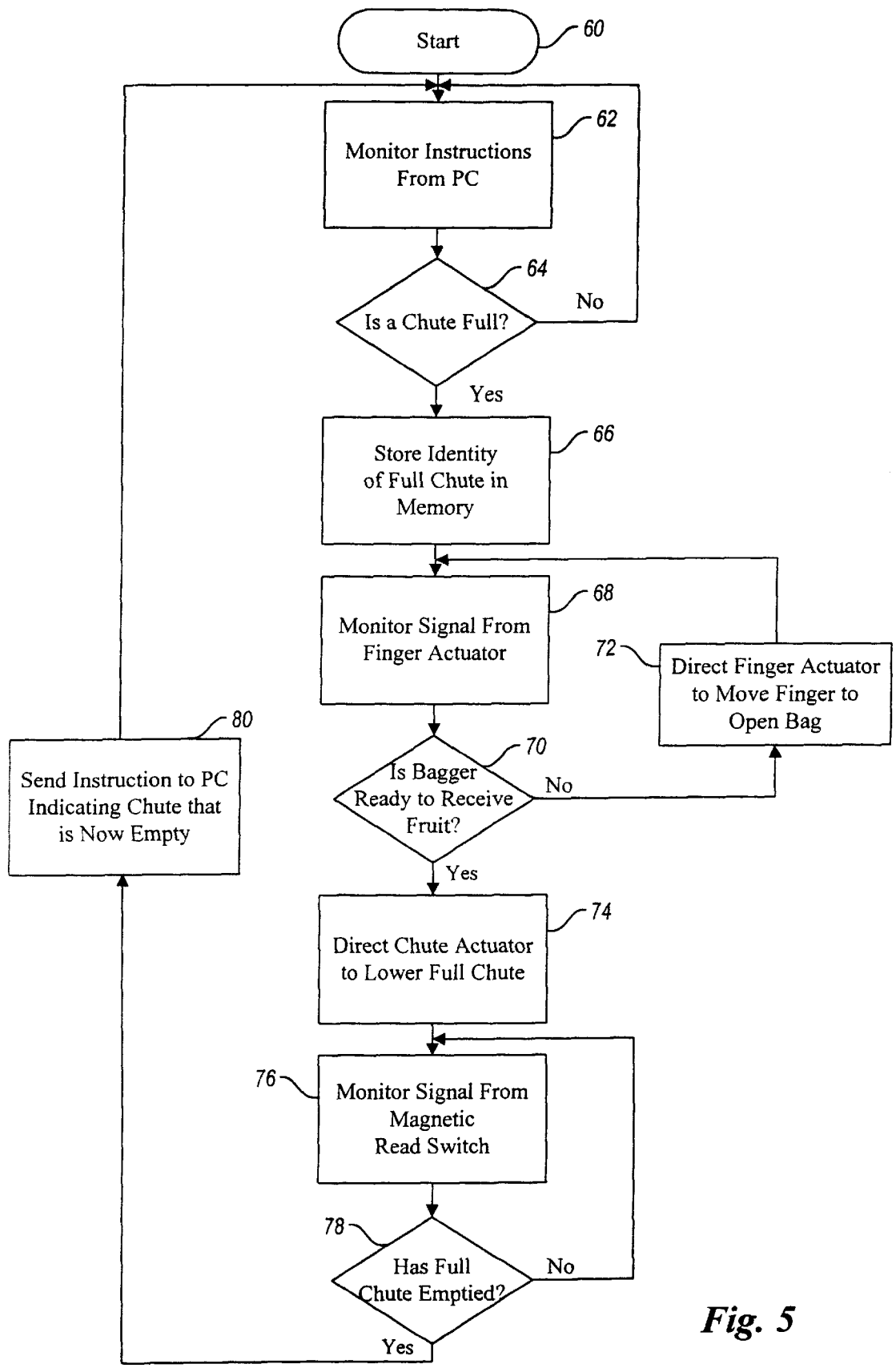
FIG. 5 is a flowchart of a software routine carried out by a programmable logic controller in the bagging apparatus of FIG. 4.

FIG. 5 is a flowchart of a software routine carried out by the PLC 44 to communicate with the PC 22 and control the bagger 16 such that fruit is delivered from the sorter 10 to the bags 34 in a rapid fashion. The PLC 44 directs the operation of the bagger 16 according to the following steps. As the operation of the bagging apparatus is beginning, the PLC 44 initiates the software routine with step 60. In step 62, the PLC 44 monitors instructions received from the PC 22 through the port 50. In step 64, the PLC 44 determines whether the PC 22 has sent an instruction to the PLC 44 indicating that one of the chutes 14 is full. If none of the chutes 14 are fill, then the PLC returns to step 62 to monitor further instructions from the PC 22. If the instruction from the PC 22 indicates that one of the chutes 14 is full, then the PLC 44 stores the identity of the full chute 14 in a memory in step 66. In step 68, the PLC 44 monitors a signal from the finger actuator 37 indicating whether a bag 34 is open. In step 70 the PLC 44 determines if the bagger 16 is ready to receive fruit from the full chute 14. If the bagger 16 is not ready to receive fruit, the PLC 44 directs the finger actuator 37 to move the finger 36 to open a bag 34 in step 72. The PLC 44 then returns to step 68 to monitor the signal from the finger actuator 37. Once the PLC 44 determines that the bagger 16 is ready to receive fruit, the PLC 44 directs a chute actuator 46 to lower the full chute 14 to allow the fruit to be directed into the open bag 34 under the brush 32 in step 74. In step 76, the PLC 44 monitors the signal from the magnetic reed switch 48 and determines in step 78 whether the full chute 14 has been emptied based on the signal. If the full chute 14 has not been emptied, the PLC 44 returns to step 76 to monitor the signal from the magnetic read switch 48. If the full chute 14 has emptied, the PLC 44 sends an instruction to the PC 22 through the port 50 to indicate that the formerly full chute 14 is now empty.

As the PLC 44 directs the bagger 16 according to the flowchart shown in FIG. 5, the PC 22 continues to provide fruit to the remaining two chutes 14 which are not full. Upon receipt of the instruction that the formerly full chute 14 is now empty, the PC 22 proceeds to direct the sorter 10 to discharge fruit to that chute 14 as required. One of the other two chutes 14 is rapidly filled to the specified weight and the PC 22 then sends an instruction to the PLC 44 identifying the new full chute 14 which the PLC 44 receives according to step 62 of the software routine. The software routine shown in FIG. 5 is run continuously by the PLC 44 until the operation of the bagging apparatus is terminated. The operation of the PLC 44 according to the software routine may be terminated by any suitable interrupt routine.

As is readily apparent, apples can be accumulated on the individual chutes. As the weight specified for a particular bag is reached on a chute, the PLC 44 directs the actuator 46 to be lowered to lower the chute to empty the apples on that chute into the bagger. As is well known, the apples can be accumulated on the chutes to a very high degree of accuracy since the PC 22 will fill the chute by waiting for the exact apple weight to top off the specified bag weight onto the chute. By feeding the multiple off-load conveyors and multiple chutes to a single bagger, it can be seen that the overall cost of the sorting and bagging apparatus is minimized while the speed of delivery of the apples and bagging remains at a high rate of speed.

While the preferred embodiments of the invention have been illustrated and described, it should be apparent that variations will be apparent to those skilled in the art. Accordingly, the invention is not to be limited to the specific embodiments illustrated in the drawings.

What is claimed is:

1. A method for providing small objects to a bagging apparatus, comprising:

sorting the objects in a sorter;

measuring a weight of each of the objects and storing the weight in a memory;

discharging a plurality of the objects into a first chute of a plurality of chutes;

calculating a first total weight of the objects discharged into the first chute;

calculating a first difference between the first total weight and a specified weight;

choosing a first selected object having a weight within a predetermined tolerance of the first difference;

discharging the first selected object into the first chute;

discharging a plurality of the objects into a second chute of the plurality of chutes;

directing the objects in the first chute from the first chute into a first bag in the bagging apparatus;

calculating a second total weight of the objects discharged into the second chute;

calculating a second difference between the second total weight and the specified weight;

choosing a second selected object having a weight within the predetermined tolerance of the second difference;

discharging the second selected object into the second chute;

discharging a plurality of the objects into the first chute; and directing the objects in the second chute from the second chute into a second bag in the bagging apparatus.

2. The method of claim 1, further comprising:

discharging a plurality of the objects into a third chute of the plurality of chutes;

calculating a third total weight of the objects discharged into the third chute;

calculating a third difference between the third total weight and the specified weight;

choosing a third selected object having a weight within the predetermined tolerance of the third difference;

discharging the third selected object into the third chute; and directing the objects in the third chute from the third chute into a third bag in the bagging apparatus.

3. The method of claim 1 wherein the act of directing the objects in the first chute from the first chute into a first bag comprises:

moving the first chute to an inclined position toward the first bag;

rotating a brush at a speed in proximity to the objects in the first chute to direct the objects into the first bag; and selecting the speed of the brush based on one or more characteristics of the objects in the first chute.

4. The method of claim 1, further comprising:

discharging one or more of the objects into one or more chutes of the plurality of chutes adjacent to the first chute concurrently with the act of discharging the first selected object into the first chute.

5. The method of claim 1, further comprising:

controlling the sorter with a first electronic device;

controlling the bagging apparatus with a second electronic device;

providing a communication from the first electronic device to the second electronic device after the act of discharging the first selected object into the first chute indicating that the first chute is full; and providing a communication from the second electronic device to the first electronic device after the act of directing the objects in the first chute from the first chute into a first bag indicating that the first chute is empty.

6. The method of claim 5, further comprising:

generating a signal from a magnetic switch after the act of directing the objects in the first chute from the first chute into a first bag, the signal from the magnetic switch indicating that the first chute has been emptied.

7. A method of transferring small objects from a sorter controlled by a first electronic device to a bagging apparatus controlled by a second electronic device, the bagging apparatus having a plurality of chutes, the method comprising:

sorting the objects in the sorter;

measuring a weight of each of the objects;

directing the sorter to discharge a first quantity of the objects into a first chute, the first quantity having a weight within a predetermined tolerance of a specified weight;

providing a communication from the first electronic device to the second electronic device identifying the first chute as being full;

directing the bagging apparatus to open a first bag;

moving the first chute to direct the objects in the first chute into the first bag;

providing a communication from the second electronic device to the first electronic device indicating that the first chute is empty;

directing the sorter to discharge a second quantity of the objects into a second chute, the second quantity having a weight within a predetermined tolerance of the specified weight;

providing a communication from the first electronic device to the second electronic device identifying the second chute as being full;

directing the bagging apparatus to open a second bag;

moving the second chute to direct the objects in the second chute into the second bag; and providing a communication from the second electronic device to the first electronic device indicating that the second chute is empty.

8. The method of claim 7, further comprising:

directing the sorter to discharge a third quantity of the objects into a third chute, the third quantity having a weight within a predetermined tolerance of the specified weight;

providing a communication from the first electronic device to the second electronic device identifying the third chute as being full;

directing the bagging apparatus to open a third bag;

moving the third chute to direct the objects in the third chute into the third bag; and providing a communication from the second electronic device to the first electronic device indicating that the third chute is empty.

9. The method of claim 7 wherein the act of directing the sorter to discharge a first quantity of the objects comprises:

directing the sorter to discharge a plurality of the objects into the first chute;

calculating a total weight of the objects discharged into the first chute;

calculating a difference between the total weight and the specified weight;

choosing a selected object having a weight within a predetermined tolerance of the difference;

directing the sorter to discharge one or more of the objects into a chute adjacent to the first chute; and directing the sorter to discharge the selected object into the first chute.

10. The method of claim 7 wherein the act of moving the first chute comprises:

moving the first chute to an inclined position toward the first bag;

rotating a brush at a speed in proximity to the objects in the first chute to direct them into the first bag; and selecting the speed of the brush based on one or more characteristics of the objects.

11. The method of claim 7 wherein the act of providing a communication from the second electronic device to the first electronic device indicating that the first chute is empty further comprises:

moving the first chute to a position to receive the objects from the sorter; and generating a signal from a magnetic switch indicating that the first chute has been moved.

* * * * *